Figure 1:
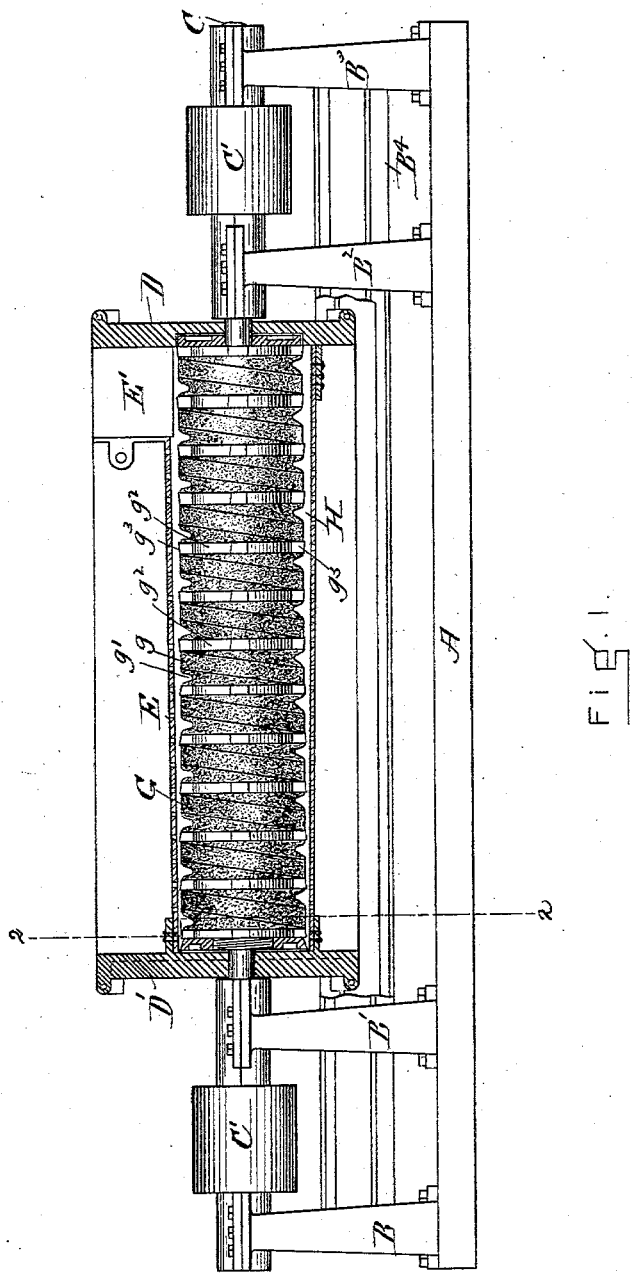

No. 753,373. PATENTED MAR. 1, 1904.
R. DERDEŸN.
COTTON SEED DELINTER.
APPLICATION FILED MAY 2, 1902.
NO MODEL. 2 SHEETS—SHEET 1.

WITNESSES: INVENTOR:

No. 753,373. PATENTED MAR. 1, 1904.
R. DERDEŸN.
COTTON SEED DELINTER.
APPLICATION FILED MAY 2, 1902.
NO MODEL. 2 SHEETS—SHEET 2.
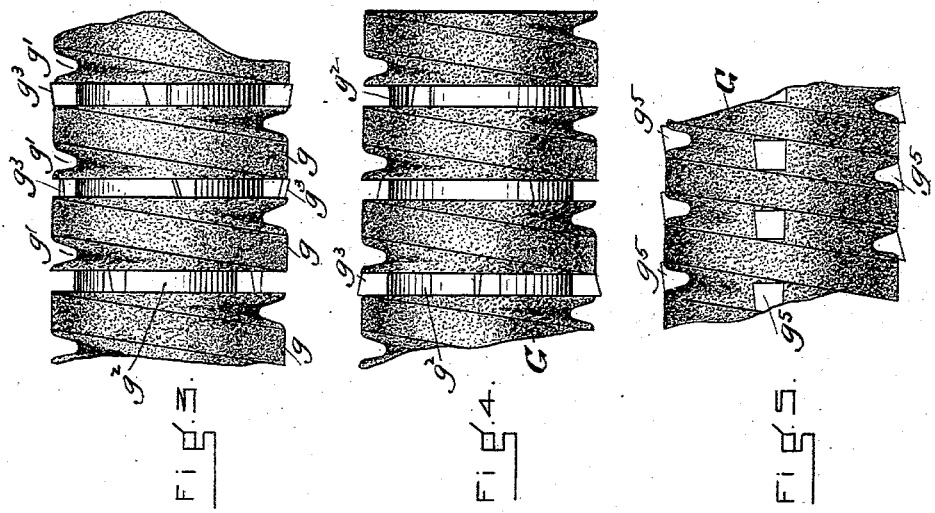
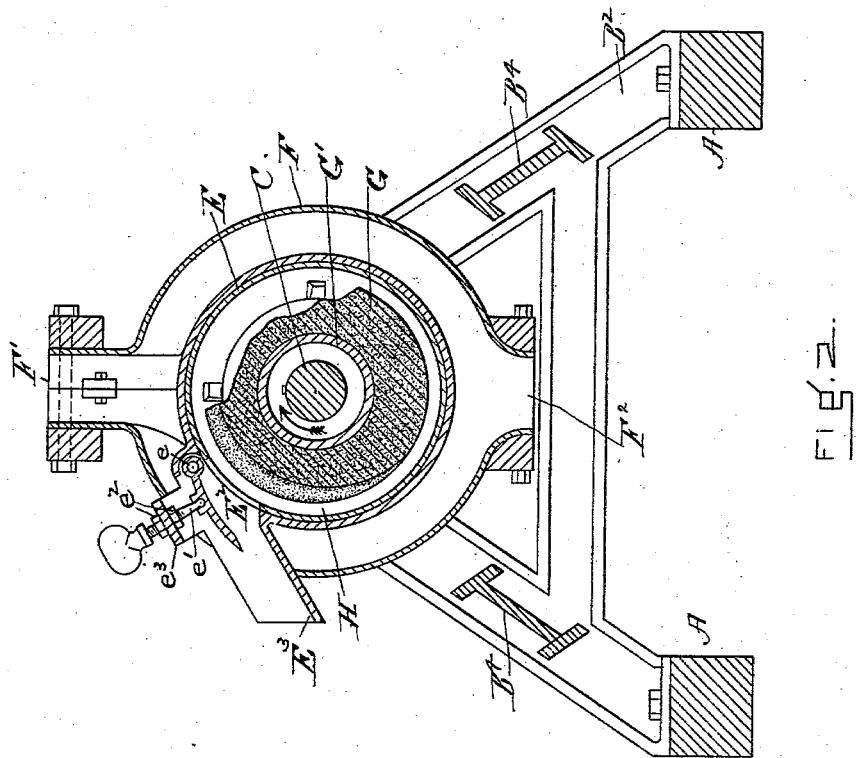
WITNESSES: INVENTOR:

No. 753,373.

Patented March 1, 1904.

UNITED STATES PATENT OFFICE.

ROMAN DERDEYN, OF VICKSBURG, MISSISSIPPI.

COTTON-SEED DELINTER.

SPECIFICATION forming part of Letters Patent No. 753,373, dated March 1, 1904.

Application filed May 2, 1902. Serial No. 105,612. (No model.)

*To all whom it may concern:*

Be it known that I, ROMAN DERDEYN, of Vicksburg, in the county of Warren and State of Mississippi, have invented a new and useful Improvement in Cotton-Seed Delinters, of which the following is a specification.

The process of delinting cotton-seed is a grinding process, and has heretofore been practiced by subjecting the lint-covered seed in a mass to the action of a horizontal cylindrical rotary abrading-roll provided with annular grooves and made of corundum or the like and surrounded by a perforated stationary cylindrical casing slightly larger in diameter than the abrading-roll. Seed was fed into the chamber between the abrading-roll and the cylindrical casing and as it came in contact with the moving roll more or less of the lint was ground off and escaped through the perforations in the casing, being preferably carried off by a suitable suction.

In the earlier machines referred to the seed covered with the fuzzy lint was fed in at one end of the chamber between the roll and the casing and was denuded of its lint to a greater or less extent, according to the pressure in the feeding-hopper; but as the seed worked farther down the chamber toward the outlet, much of the lint having been removed, the pressure was proportionately diminished. Consequently in these machines the process was never satisfactorily carried out, not only because the machines had no positive feed, but also because the seed was never packed against the roll during its whole travel through the machine, owing to the fact that the chamber between the roll and the casing was for its entire length of the same dimensions, while the bulk of the seed decreased, owing to its loss of lint. An improvement upon this class of machinery was described in Letters Patent No. 659,840, dated October 16, 1900, which improvement consisted in the shaping of the abrading-roll with annular grooves and the cylindrical casing with relation to each other, whereby the seed-chamber between them was larger at its inlet than at its outlet, the abrading-roll being provided at the inlet with a feed-screw, so that the seed was fed from the hopper directly onto the feed-screw, and after the machine had once been filled with seed the fresh seed was forced forward by means of this feed-screw, so that the chamber or space between the abrading-roll and the casing was kept full of seed under pressure sufficient to cause the seed to be delinted by grinding, this condition being also in a measure assisted by an adjustable outlet for the seed, by means of which the seed was prevented from escaping from the machine too rapidly.

My invention relates to an improvement upon this latter machine; and it consists in giving to the surface of the abrading-roll a feeding function, as well as a grinding function, by providing it with spiral instead of annular grooves and at the same time assisting or retarding the feed of the seed through the machine by the interposition periodically along the roll or at such places or parts thereof as it seems necessary pushing or retarding arms, which by their shape may serve either to assist in the feed or retard it. I prefer that these auxiliary devices shall be made separate from the sections of the abrading-roll and interposed between them in order that the construction of the machine may be adjusted according to the kind of seed to be delinted, as experience has shown that some kinds of seed are more difficult to delint than others. To economize power, it is undesirable to use more pressure than is necessary. Moreover, too much pressure will damage the seed. Hence the value of some form of adjustment. To secure this variation in pressure, the feed and the outlet should be adjustable with relation to each other to maintain the seed in the delinting-chamber for a sufficient length of time and under sufficient pressure to accomplish the necessary result.

My invention will be understood by reference to the drawings, in which—

Figure 1 is a longitudinal vertical sectional view showing the casing in section and the other parts of the machine in operation. Fig. 2 is an enlarged cross-section taken on line 2 2 of Fig. 1, showing more especially the outlet, Figs. 3, 4, and 5 being details showing various forms of rolls adapted to be used in the manner described.

Upon a suitable base A A are mounted four A-shaped frames B B' B² B³, each provided at its upper end with a suitable bearing adapted to support the shaft C. These frames B, &c., are braced by longitudinal beams B⁴. Upon the shaft C are mounted two pulleys C' C', by means of which power is applied to turn the shaft C.

D D' are stationary heads mounted between the frames B' B² and supporting the ends of the perforated casing E and the ends of the outside imperforate casing F. The perforated casing E has an inlet E' at one end thereof and tapers from its inlet end toward the opposite head D'. Within this perforated casing E is the abrading-roll G, mounted upon a sleeve G', supported on the shaft C to rotate therewith in the direction of the arrow. (See Fig. 2.) The imperforate casing F forms, with the perforated casing, a suction-chamber and is connected with a vacuum-fan or other such an apparatus through an opening F' in its top and is provided with an opening F² underneath, through which a current of air may be drawn in by the suction apparatus (not shown) to carry out the lint and other like matter which is forced out through the perforations in the casing E during the grinding operation. The casing E has an outlet E², closed by an adjustable gate hinged at $e$ and controlled by means of a suitable set-screw $e'$ and set-nuts $e^2$. The screw $e'$ passes through a cross-bar $e^3$, carried by the imperforate casing F. A trough E³ directs the escape of the seed as it passes out through the outlet E² in the perforated casing E. The space between the exterior of the abrading-roll G and the interior of the perforated casing E forms a seed-chamber H, through which the seed passes during the delinting operation from the inlet E' to the outlet E².

As so far described the machine resembles, generally speaking, the machine of the said Letters Patent.

My improvement consists in the construction of the abrading-roll G, whereby it serves also as a feed-roll, thereby doing away with the feed device of the patent and enabling the machine to be shortened and the feed to be positive throughout the chamber H. For this purpose it is preferably made up of a number of sections $g$, of corundum or the like, each section being grooved, as at $g'$, with a spiral groove extending wholly or partly around it, each section being separated from the one next to it by means of a spider or disk $g^2$, having projecting from it a number of arms $g^3$. The face of each arm which advances through the seed and which may be termed its "advancing" face $g^4$ lies, preferably, in a plane cutting the axis of the roll at a slight angle, so that in its rotation as it moves through the body of seed it will not only stir the seed, but also will tend to throw the seed in a direction parallel with the axis of the roll either toward the inlet or the outlet end of the chamber. These spiders may be arranged either as shown in Fig. 3, where their arms tend to throw the seed to the left or outlet, or, as in Fig. 4, where their arms tend to throw the seed to the right or inlet, and accordingly they will assist the feed or retard it, becoming feeding or retarding arms, and these spiders may be arranged on the shaft C, so that their arms will present spiral lines around the roll (see Fig. 3) or that these arms will lie in a straight line, (see Fig. 1,) as may be deemed best. Where the arms are arranged to throw the seed toward the outlet, it is preferable that the angle of their faces with the axis of the roll should be different from the angle of the spiral with said axis, as shown in the drawings, in order that the rate of movement of the seed toward the outlet may be changed, and consequently the seed be more thoroughly broken up in its passage than it might otherwise be if the arms were at the same angle with the spiral.

In Fig. 5 is shown another form of roll in which instead of a spider with arms the spiral grooves in the abrading-roll are provided with stirring projections $g^5$, which serve to interrupt the passage of the seed, stirring it up, throwing it out of the groove, and insuring the contact of all the seed with the grinding-surfaces. These stirring projections $g^5$ are arranged with their advancing faces set at an angle, so that they accomplish the same purpose as the projections $g^3$.

It will be noted that the threads upon the sections of the abrading-roll are left-handed, and in operating the machine shown in the drawings the roll is rotated in the direction shown by the arrow in Fig. 2—that is, from left to right—so that the tendency of these spirals is to force the seed toward the small end of the seed-chamber H.

In operation, belts being applied to the pulleys C' C' to rotate the roll in the proper direction and with considerable rapidity—say a thousand revolutions a minute—and the suction mechanism being applied to withdraw the lint from the machine, seed is fed in at the inlet E' and striking upon the abrading-roll is forced toward the small end of the seed-chamber. In its travel from the inlet to the smaller or outlet end of the chamber H the first seed introduced is delinted to a greater or less degree, according to circumstances; but it is not until the seed-chamber H becomes practically full of seed that the commercial delinting of the machine begins. The imperfectly-delinted seed as it passes out through the outlet E² may be collected and again passed through the machine, which in the meantime is performing a perfect delinting operation by reason of the fact that owing to the diminishing size of the seed-chamber H and the feeding action of the grinding-roll and the comparative smallness of the outlet the seed is packed more or less in the seed-chamber H and stirs about, so that each seed must come in contact with the abrading-roll at some portion of its travel through the seed-chamber and have its lint ground off. During this operation the action of the spiral grooves is to force the seed forward toward the outlet, and the action of the spider-arms is to either assist or retard this movement, according to the angle of the advancing faces of these spider-arms, which also cause the seed with which they come in contact to constantly change its position.

By the use of interchangeable spiders, the advancing arms of which are at different angles, acting in a chamber of diminishing cross area the efficiency of the machine may be varied according to the peculiarity of the seed to be delinted. For the efficiency of this machine arises not only from this combination of a spirally-grooved abrading-roll with arms projecting therefrom, which may be varied as occasion requires to serve either as feeding or retarding arms, but also from the fact that as the seed-chamber is smaller at the outlet than at the inlet the spiral thread and the spider-arms are effective to pack the seed in a way in which it could not be packed if the seed-chamber were of uniform size throughout. Moreover, as the spiral grooves and arms are located all along the abrading-roll the feed is positive during the entire passage of the seed from one end of the chamber to the other instead of being positive merely at the inlet, as is the case with the prior machines, and in my present machine the narrowing wall of the chamber coöperates with this positive feed to require the intimate contact of all the seed with the abrading-roll. Thus the abrading-roll performs the function of a feed and in combination with the inner contracting-walls of the seed-chamber a delinting mechanism of great efficiency as constructed, which efficiency may be adjusted to the quality of seed to be acted upon by changing the spiders. This construction also makes it unnecessary to use any other means of feeding the seed than those supplied in the abrading-roll itself.

The lint is forced out from the chamber H through the perforations in the casing E by the pressure and working of the seed in the chamber and is carried off by the suction apparatus. The lint being forced out in this manner from the chamber H relieves it of a considerable portion of its contents as the abrading operation proceeds, and as more lint may be forced out during the first part of the delinting operation than during the last part it is preferable to have the perforations in the casing E larger at the inlet end thereof than at the outlet.

What I claim as my invention is—

1. In a delinter, a perforated casing and an abrading-roll located within said casing, said casing and said roll being shaped with relation to each other as described, whereby the chamber between said casing and said roll shall be smaller at one end than at the other, said chamber having an inlet at its larger end and an outlet at its smaller end, and said abrading-roll comprising spirally-grooved abrading-sections and spiders having projecting arms, the advancing faces of which face toward the outlet of said chamber, whereby seed poured into the inlet will be simultaneously fed toward the outlet and abraded in transit, as described.

2. In a delinter, a seed-chamber larger at one end than at the other, an inlet located at the large end of said chamber, and an outlet located at its small end, an abrading-roll located within said chamber and comprising alternate sections of abrading material and spiders provided with projecting arms, the advancing faces of said projecting arms facing toward the inlet end of said seed-chamber, and said abrading-sections being provided with a spiral groove whereby the rotation of said abrading-roll may act not only to delint the seed, but also to feed it from the inlet to the outlet, as described.

3. In a delinter, a seed-chamber larger at one end than at the other, an inlet located at the large end of said chamber, and an outlet located at its small end, an abrading-roll located within said chamber and comprising alternate sections of abrading material and spiders provided with projecting arms, the advancing faces of certain of said projecting arms facing toward the inlet end of said seed-chamber and the advancing faces of certain other arms facing toward the outlet end of said seed-chamber, and said abrading-sections being provided with a spiral groove whereby the rotation of said abrading-roll may act not only to delint the seed, but also to feed it from the inlet to the outlet, as described.

4. In a delinter, a seed-chamber larger at one end than at the other, an inlet located at the large end of said chamber and an outlet located at the small end thereof, an abrading-roll located within said chamber and comprising alternate sections of abrading material, and spiders provided with projecting arms, the advancing faces of said projecting arms facing toward the inlet of said seed-chamber, and means whereby the seed is fed to said seed-chamber, as set forth.

5. In a delinter, a perforated casing and an abrading-roll, both of substantially the dimensions described, said abrading-roll being located within said casing and forming therewith a seed-chamber larger at one end than at the other, said chamber being provided with an inlet at its large end and an outlet at its small end, and said abrading-roll being composed of a series of sections of grinding material, each section being provided with a spiral groove, spiders provided with arms located between said sections, certain of said arms having an advancing face facing toward the outlet of said seed-chamber, and certain of said arms having an advancing face facing toward the inlet of said chamber, whereby said abrading-roll and certain of said spider-arms will serve as a positive feed to the seed, and other of said spider-arms will serve as an obstruction to the travel of the seed, as described.

6. In a delinter, a perforated casing, an abrading-roll located within said casing, the chamber between said casing and said roll being smaller at one end than at the other, and said chamber having an inlet at its larger end and an outlet at its smaller end, said roll comprising a series of spirally-grooved abrading-sections, and a series of spiders having projecting arms, each spider being located between two of said abrading-sections, and the advancing faces of said spiders facing toward the outlet of said chamber and being at an angle with the axis of said roll differing from the pitch of the screw-threads thereon, whereby when said chamber is filled with seed and said roll is rotated said seed will be advanced by the action thereon of said spiral grooves and the projecting arms of said spiders, the rate of movement of said seed varying in the different parts of said chamber, as and for the purposes described.

In testimony whereof I hereunto set my name this 28th day of March, 1902.

R. DERDEYN.

Witnesses:
AUGUST ELBERT,
JOHN G. GILLAN.